(12) United States Patent
Biaud

(10) Patent No.: US 7,614,692 B2
(45) Date of Patent: Nov. 10, 2009

(54) CHILD CAR SEAT SWIVELLING BETWEEN A FORWARD FACING POSITION AND A DOOR FACING POSITION, WITH AUTOMATIC RETURN TO FOWARD FACING POSITION

(75) Inventor: Richard M. Biaud, Trementines (FR)

(73) Assignee: Cosco Management, Inc., Wilmington, DE (US)

( * ) Notice: Subject to any disclaimer, the term of this patent is extended or adjusted under 35 U.S.C. 154(b) by 414 days.

(21) Appl. No.: 10/918,066

(22) Filed: Aug. 13, 2004

(65) Prior Publication Data

US 2005/0225139 A1    Oct. 13, 2005

(30) Foreign Application Priority Data

Aug. 13, 2003 (FR) ................... 03 09934

(51) Int. Cl.
*A47C 1/08* (2006.01)
*A47C 15/00* (2006.01)

(52) U.S. Cl. .................. 297/256.12; 297/256.16; 297/256.1; 248/415

(58) Field of Classification Search .......... 297/250.1, 297/256.16, 256.12, 256.13, 344.21, 344.22; 248/415, 417, 425, 418
See application file for complete search history.

(56) References Cited

U.S. PATENT DOCUMENTS

| | | | |
|---|---|---|---|
| 2,822,858 A | | 2/1958 | Mussler .................... 155/5 |
| 2,992,852 A | | 1/1961 | Loofbourrow et al. ......... 296/68 |
| 3,572,817 A | * | 3/1971 | Colautti et al. ............ 296/65.07 |
| 3,718,365 A | * | 2/1973 | Gibson ................... 297/344.24 |
| 3,821,825 A | * | 7/1974 | Bailey ........................ 114/363 |
| 4,310,196 A | * | 1/1982 | Vogel .................... 297/411.32 |
| 4,762,364 A | * | 8/1988 | Young .................... 297/256.12 |
| 4,802,706 A | | 2/1989 | Onimaru et al. .............. 296/68 |
| 4,802,708 A | * | 2/1989 | Vos et al. ..................... 297/252 |
| 4,936,629 A | * | 6/1990 | Young .................... 297/256.12 |
| 5,136,221 A | | 8/1992 | Takizawa et al. ............ 318/567 |
| 6,260,920 B1 | * | 7/2001 | Tolfsen .................. 297/256.16 |
| 6,520,579 B2 | * | 2/2003 | Kassai et al. ........... 297/256.12 |
| 6,746,080 B2 | * | 6/2004 | Tsugimatsu et al. .... 297/256.13 |
| 6,793,283 B1 | * | 9/2004 | Sipos .................... 297/256.12 |
| 6,938,954 B1 | * | 9/2005 | Hendren et al. ........ 297/256.12 |
| 7,357,451 B2 | | 4/2008 | Bendure et al. | 
| 2001/0048237 A1 | | 12/2001 | Kassai et al. ........... 297/256.12 |
| 2002/0195850 A1 | | 12/2002 | Kassai et al. ................ 297/250 |

FOREIGN PATENT DOCUMENTS

| | | |
|---|---|---|
| DE | 100 17 215 A1 | 10/2001 |
| DE | 101 04 137 A1 | 8/2002 |
| DE | 101 20 769 A1 | 10/2002 |
| EP | 0 302 607 A2 | 2/1989 |

(Continued)

*Primary Examiner*—David Dunn
*Assistant Examiner*—Erika Garrett
(74) *Attorney, Agent, or Firm*—Barnes & Thornburg LLP

(57) ABSTRACT

A child car seat is provided, which comprises a swivel seating part assembled on a fixed base so that the seat can be orientated according to two positions, one forward facing and the other facing the side door, and disengaging return means which, when engaged, act on a plate connected to said seat so as to return the latter to said forward facing position.

20 Claims, 4 Drawing Sheets

FOREIGN PATENT DOCUMENTS

| | | |
|---|---|---|
| EP | 0656 277 A1 | 6/1995 |
| EP | 0 853 018 A1 | 7/1998 |
| EP | 1 145 899 A1 | 10/2001 |
| EP | 1 354 753 A1 | 10/2003 |
| FR | 2680734 A1 | 3/1993 |
| FR | 2768089 A1 | 3/1999 |

* cited by examiner

CHILD CAR SEAT SWIVELLING BETWEEN A FORWARD FACING POSITION AND A DOOR FACING POSITION, WITH AUTOMATIC RETURN TO FOWARD FACING POSITION

CROSS-REFERENCE TO RELATED APPLICATION

Cross-reference is hereby made to U.S. application Ser. No. 10/918,058, filed Aug. 13, 2004, which is entitled "CHILD CAR SEAT INCLINING AND SWIVELING BETWEEN A TRAVELLING POSITION AND AN INSTALLING POSITION," and which is hereby incorporated by reference.

FIELD OF THE INVENTION

The invention relates to the field of child care. More precisely, the invention relates to child seats intended to be fitted in a vehicle.

BACKGROUND OF THE INVENTION

As regards these car seats, one of the difficulties is accessibility, notably due to the limited space left by the door and the seat of the vehicle. It is generally rather difficult to install a child into the seat or to lift him out of it.

So as to facilitate installing the child, it was thus proposed to make the seat swivel in relation to a base or a fixed structure, the seat being likely to be moved between two positions:

a position for installing the child, facing the side door (there are generally two installing positions, the seat being able to turn either right or left); and a forward facing travelling position.

The invention particularly relates to this type of child seat.

The installing position is of course only a temporary position. When the car is being driven, the seat must imperatively be in the travelling position, perfectly forward facing, for evident safety reasons.

However, it can happen that, after having installed and attached the child in the seat, the latter is insufficiently brought into a forward facing position, without the seat truly reaching this position. The seat is thus in an intermediary position, relatively close to the travelling position.

Indeed, it is not always easy to verify that the seat is properly in the travelling position, and not in a position close to it, but not acceptable.

Indeed, such a situation is not without risk. Indeed, all the safety measures fitted to child car seats are designed and optimised to ensure the retention of the child in the event of an impact as long as the seat is in a perfect forward facing position.

In addition, the seat risks rotating, for example in the event of bends in the road.

Embodiments of the present invention provide solutions to these and other problems, and offer other advantages over the prior art.

SUMMARY OF THE INVENTION

More precisely, the purpose of the invention is to provide a child seat whose seating part is moveable between a travelling position and a position for installing the child, which guarantees a correct travelling position in all circumstances.

The invention also has the purpose of providing such a child car seat that further facilitates the installing of the child in the seat.

The invention yet again has the purpose of providing such a seat that is of simple design, easy to manufacture and assemble.

Another purpose of the invention is to provide such a seat that can be simply and quickly installed in a car.

These purposes as well as others which will become clearer later on are reached with the help of a child car seat intended to be assembled on a passenger seat of a motor car, comprising a swivel seating part assembled on a fixed base so that the seat can be orientated according to at least two positions, a travelling position, forward facing, and at least one installing position, facing the side door. This car seat comprises, according to the invention, return means with the tendency of returning said seating in said travelling position, which are:

inactive, or disengaged, on a first angular section, starting from the installing position and ending at a pre-set intermediary position, the movement along this first angular section being manually ensured by the user;

active, or engaged, on a second final angular section, starting from said pre-set intermediary position and ending at said travelling position, so that the seat is systematically returned to the travelling position, without any manual intervention from the user, when it is in said second angular section.

Thus, the seating part automatically returns to the exact position facing forward, even if the user did not correctly reposition it. The child is therefore always safe (the locking into position being correct).

The return means are therefore inactive when the child is being installed, so that it is unnecessary to simultaneously hold the seat, to stop it from returning to the travelling position.

These return means become effective at end of travel. The user only has to perform a part of the movement, or to instigate it, and then return means take over, and finish the correct placing in the travelling position.

Incorrect placing is thus avoided (unfinished repositioning, and therefore badly or non locked seat), even if the user does not fully perform the repositioning.

Preferably, the car seat comprises two installing positions, respectively adapted to left or right fitting in the car, and said return means are symmetric, so as to allow to return said seat to said travelling position in the same manner from one or other of the installing positions.

In an advantageous embodiment, said return means comprise at least one moveable element assembled on said fixed base between an engaged position in which said moveable element collaborates with a housing made in said plate and a disengaged position according to which said moveable element is in recess from said housing.

Advantageously, the seat has a swivel plate forming a cam in which lies at least a housing of which at least one of the edges creates a point of application for said return means.

Advantageously, said swivel plate has a single housing whose edges each create a point of application for each of said respective bodies.

According to another preferred aspect of the invention, said return means collaborate with at least one moveable element assembled so as to swivel on said base. In this case, said moveable element(s) advantageously comprise at least one drive arm likely to penetrate said housing of said plate and at least one return arm extending opposite said drive arm in relation to the axis of rotation of said moveable element.

Preferably, said return arm is coupled to elastic means tending to help the engaging of said drive arm into a housing of said plate.

Advantageously, means for limiting the rotation of said moveable element are provided.

According to different advantageous embodiments of the invention, the seat comprises means for controlling the engaging and/or disengaging of said return means, taking into account at least one of the aspects belonging to the group comprising:

the detection of a child in said seat;
the detection of the locking of the harness of said seat;
an order from a user.

Other characteristics and advantages of the invention will become clearer upon reading the following description of a preferable embodiment of the invention, given by way of non restrictive example and made in reference to the annexed drawings.

DETAILED DESCRIPTION OF ILLUSTRATIVE EMBODIMENTS

As previously indicated, the principle of the invention consists in associating the plate of a swivel seat with return means intended to return the seat in the forward facing position.

These return means can act constantly and/or in every seat position. According to the preferred embodiment hereafter described, these return means solely act on the final section of the rotation of the seat. In other terms, it ensures the end of the return in the correct position when the user has manually instigated the movement, once the child has been correctly installed.

Figure 1:
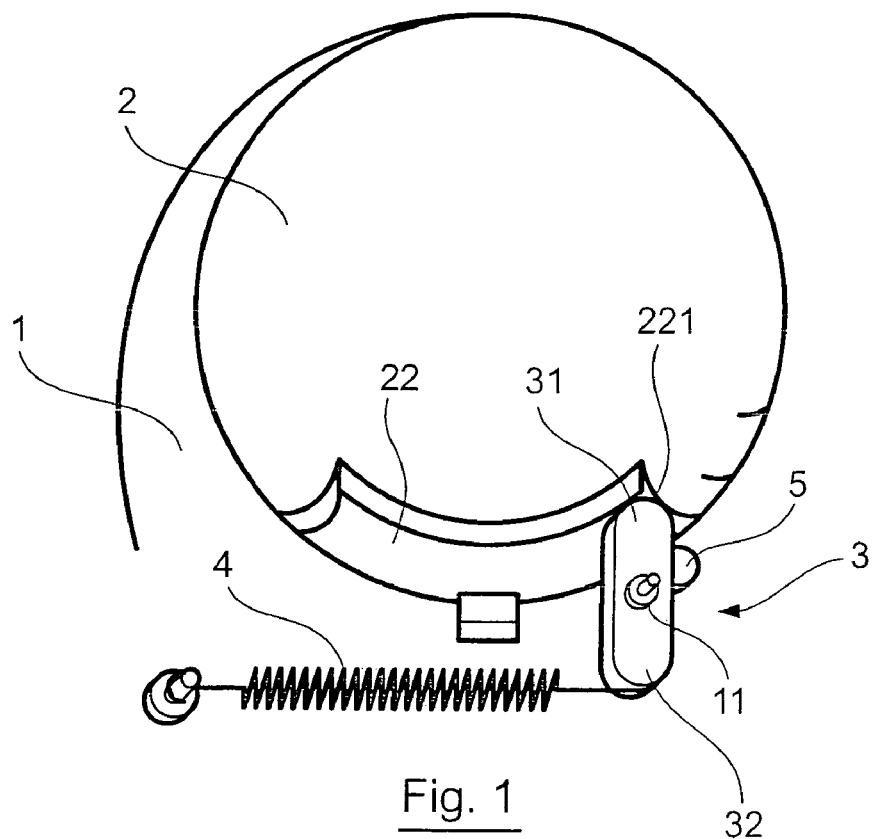
FIGS. 1 and 2 are partial views of a child seat according to one embodiment of the invention, wherein the return means of the plate towards the forward facing position being respectively engaged and disengaged.
Figure 2:
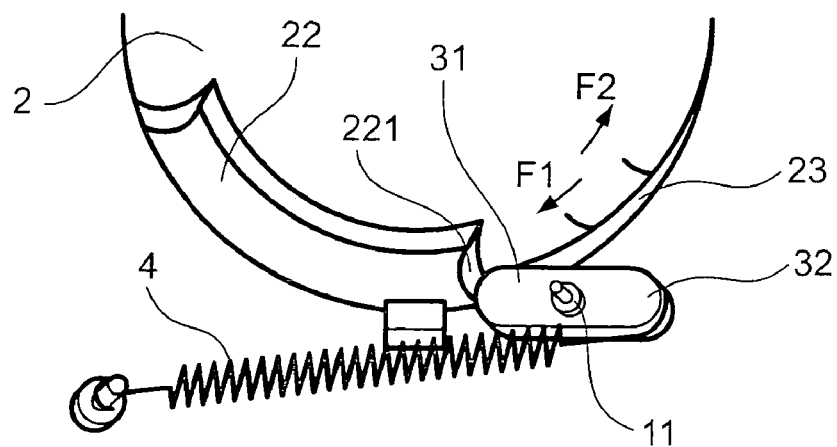

FIGS. 1 and 2 illustrate this general principle of the invention.

As illustrated in these figures, the seating part of a swivel seat connected to a swivel plate 2 assembled on a base 1 between a forward facing position (as shown in FIG. 1) and a door facing position in which the plate is swiveled by approximately 45° in relation to the forward facing position.

According to this embodiment of the invention, the return means fitted to the seat comprise a moveable swivel element 3 assembled on the base 1 about an axis 11. This moveable element 3 has two arms (diametrically opposite compared to the axis 11):

a drive arm 31 intended to penetrate a slot 22 extending over a fraction of the periphery of the plate 2; and a return arm 32, coupled to an elastic element 4, such as a spring.

As shown in FIGS. 1 and 2, the drive arm 31 is moveable between an engaged position in which it is engaged in the slot 22, which form the housing, and a disengaged position in which it is in recess from slot 22.

We note that the assembly of the spring 4 with the return arm 32 is fitted so as to help the engaging of the drive bar 31 in the slot 22 of the plate 2.

Generally, the seat also comprises second disengaging symmetric return means (not represented for simplification purposes), which, when engaged, act on the plate 2 so as to return it to a door facing position. Such second return means are of the same sort as those described for the forward facing position, and are assembled so as to collaborate with the slot 22, at the opposite end to the one near to which are assembled the return means to the forward facing position. This allows to place the seat both on the left and the right of the car.

The operating of the disengaging return means which have just been described will now be explained.

As regards the following description, the start position is that illustrated in FIG. 1, that meaning forward facing.

When the user starts to swivel the seat towards an installing position in the direction indicated by the arrow F1 in FIG. 2, the wall 221 of the slot 22 pushes the drive arm 31 also in the direction of the arrow F1 until the latter is free from the slot 22 and is in a disengaged position, leaning against the peripheral wall 23 of the plate 2.

From now on, the user can continue to swivel the seat freely, that meaning without the return means applying any force on the plate, as they are in the disengaged position.

Obtaining the door facing position can be made easier by the aforementioned second return means.

In order to obtain the return of the seat in a forward facing position the user starts to swivel the seat in the direction indicated by the arrow F2 in FIG. 2, until the wall 221 of the slot 22 reaches the drive arm 31.

At this stage, as the slot 22 extends in front of the return arm 31, the latter swivels towards the inside of the slot 22 and engages into it, this being under the force of the spring 4 which acts upon the return arm 32.

As soon as the arm 31 starts to engage into the slot 22, it is the action of the spring 4 which takes over so as to swivel the plate 2 as far as the forward facing position, through the use of the arm 31 which pushes on the wall 221 of the slot 22.

To restrict the rotation of the return means 3, a limit stop 5 is fitted on the base 1 and positioned so that when the arm 31 is leaning against this limit stop 5 it remains engaged in the slot 22.

Figure 3:
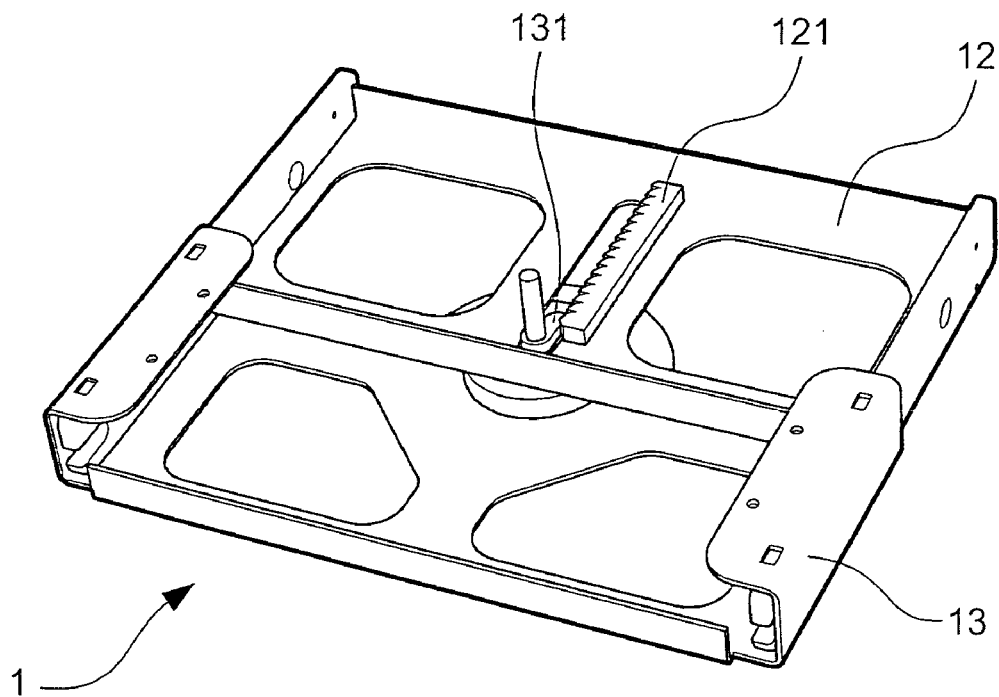
FIGS. 3 and 4 are perspective views, respectively from above and beneath, of a base fitted with means for anchoring and intended to equip a seat according to one embodiment of the invention.
Figure 4:
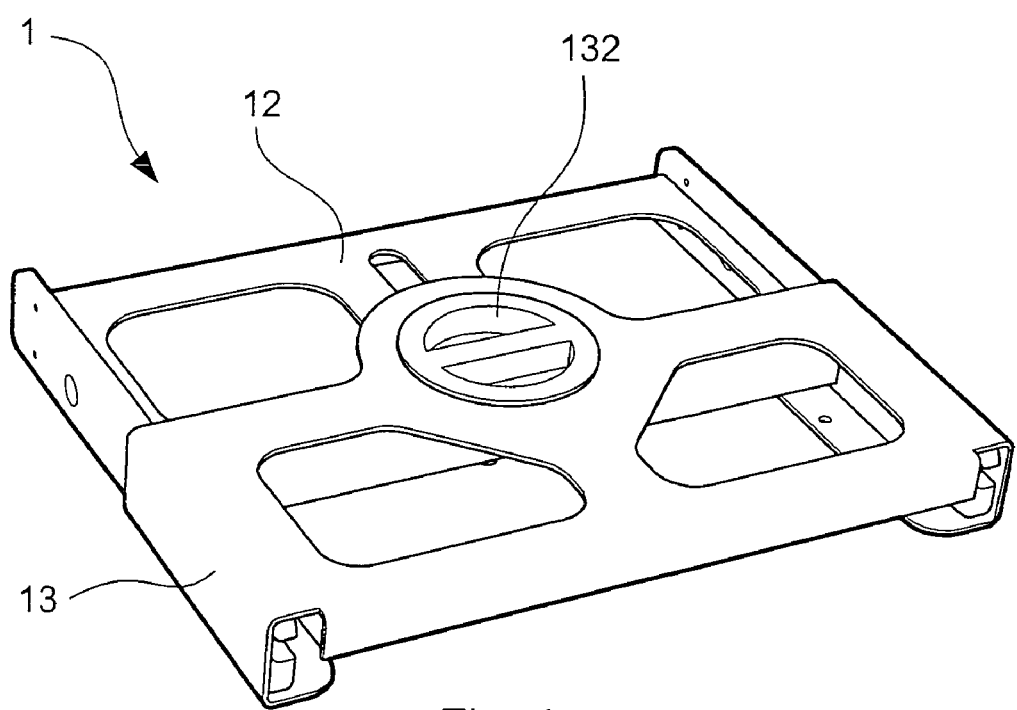

The swivel seat which has just been described is advantageously assembled on a base 1 in compliance with the "Isofix" standard as illustrated in FIGS. 3 and 4. This base has means for anchoring to a fixed structural element which form a stand-out at the base of the backrest of the rear car seat.

Figure 5:
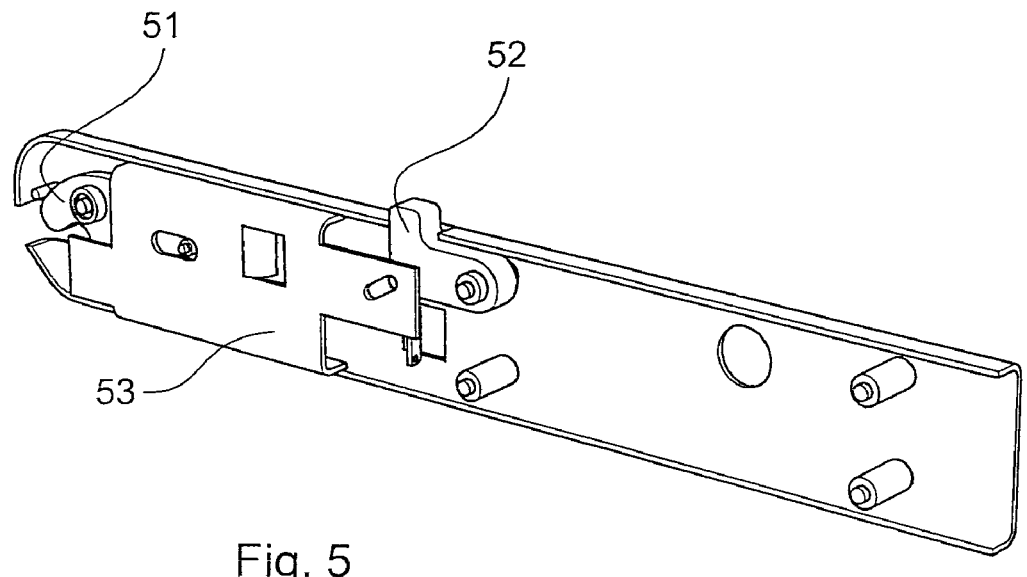
FIGS. 5 and 6 are perspective views of the side parts of a base as illustrated in FIGS. 3 and 4.
Figure 6:
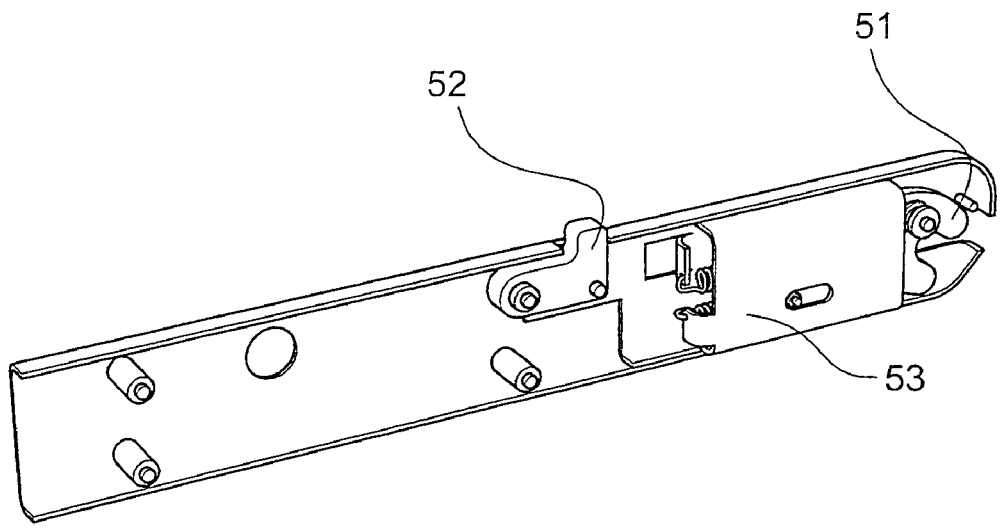

In reference to FIGS. 5 and 6, the means for anchoring are fitted to each side of the base 1 and are equipped at their end with clamp pieces 51 coupled to means for locking/unlocking notably incorporating a swivel lever 52 likely to act on a part 53 moveable in a straight line.

We note that a cable (non represented) is fitted to actuate the locking/unlocking of each clamp piece 51. This cable extends so as to be accessible at the far ends 511 of each side element incorporating a clamp piece 51.

As shown in FIGS. 3 and 4, these means for anchoring are connected to an element forming a slide 12 intended to slide in relation to a base element 13, so that the means for anchoring are moveable between an opened position (corresponding to the position in which they allow the anchoring of the seat to the car) and a retracted position limiting the amount of place the base takes up for example for it storage.

Moreover, this base 1 comprises means for blocking or releasing the position of the slide 12 in relation to the base element 13. The position of this slide is adjustable, so as to allow an adaptation to every car (the backrest of the seat must in all circumstances lean against the car seat).

According to this embodiment, these means for blocking/releasing comprise a swivel lever 131 connected to the base element 13 intended to collaborate with a rack 121 connected to the slide 12. We note that the lever 131 is coupled to elastic return means (non represented) which tend to return it into an engaged position with the rack 121.

This lever 131 is held by an axis connected in rotation to a handgrip 132, creating means for controlling the blocking/releasing of the position of the slide 12 in relation to the base element 13, this allowing to act, from the underneath of the base, on the angular position of the lever 131 with the aim of engaging the latter with the rack 121 or disengaging it from the latter.

Thus, whilst installing the seat in the car, the slide (and therefore the clamp pieces) is in the opened position. The clamp pieces are latched and locked onto the fixed structural element fitted for this purpose to the car.

All that is required now is to push the seat towards the backrest of the car seat in order to bring the slide 12 towards the retracted position, this being allowed via the orientation of the teeth of the rack. Inversely, the redeployment of the slide is blocked by the rack/lever system and it is necessary to actuate the handgrip 132 to be able to move the slide 12 in relation to the base element 13.

We thus understand that the rack/lever system ensures the retention of the slide in relation to the base element, in particular in the event of an impact to the car.

In a simplified embodiment, the return means can constantly act on the seat. In this case, we can envisage a means for blocking in the door facing position, that the user will free up when the child has been installed. The seat will then automatically return to the forward facing position.

We can also envisage that the implementation of the return means are dependent on various parameters, independently and/or simultaneously, such as the detection of a child (for example via the detection of a weight greater than a given threshold), the detection of the locking of the child harness, a manual control of the user, and/or the detection of the closing of the car door.

Figure 7:
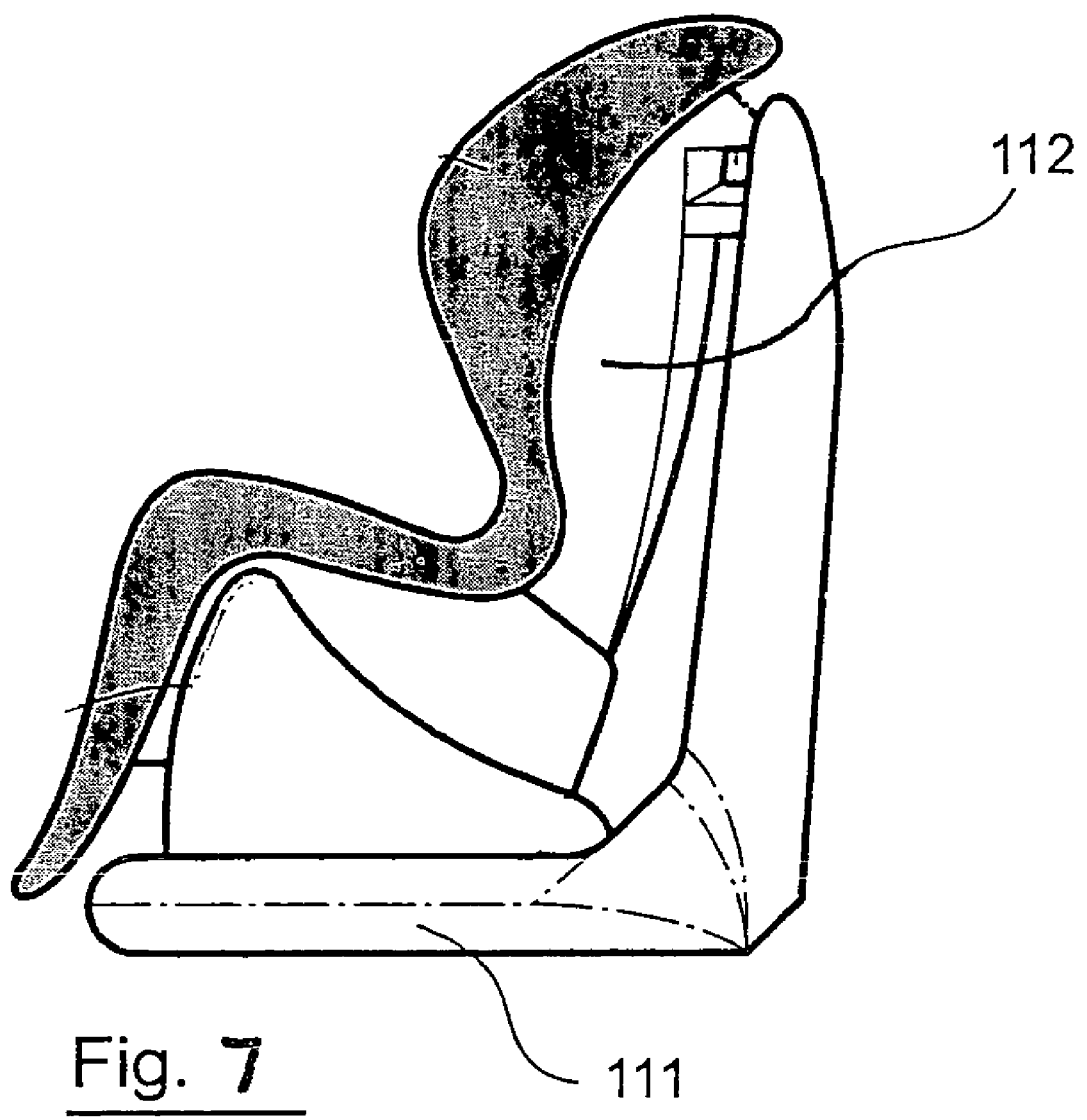
FIG. 7 is a perspective view of a child car seat for assembly on the swivel plate shown in FIGS. 1 and 2 and the base shown in FIGS. 3 and 4.

FIG. 7 is a perspective view of a child car seat 112 for assembly on the swivel plate 2 shown in FIGS. 1 and 2 and the base 1 shown in FIGS. 3 and 4. When the swivel plate 2 is mounted between the base 1 and the seat 112, in the area shown generally at 111, the seating part is moveable between a forward facing travelling position and a rotated position for installing the child, which guarantees a correct travelling position in all circumstances.

What is claimed is:

1. A child car seat, intended to be assembled on a passenger seat of a vehicle, wherein the child car seat comprises:
   a swivel seating part assembled on a fixed base so that the seat can be orientated according to at least two positions, a travelling position, forward facing, and at least one installing position, facing a side door of the vehicle; and
   return means for tending to return said swivel seating part to said travelling position, wherein said return means are:
      inactive, or disengaged, on a first angular section, starting from the installing position and ending at a pre-set intermediary position, the movement along the first angular section being manually ensured by the user; and
      active, or engaged, on a second final angular section, starting from said pre-set intermediary position and ending at said travelling position, so that the seat is systematically returned to the travelling position, without any manual intervention from the user, when it is in said second angular section.

2. The child car seat according to claim 1, wherein the child car seat comprises two installing positions, respectively adapted to left or right fitting in the vehicle, and wherein said return means are symmetric, so as to allow the swivel seating part to return to said travelling position in the same manner from one or other of the installing positions.

3. The child car seat according to claim 1, wherein said swivel seating part comprises a plate and said return means comprise at least one moveable element assembled on said fixed base between an engaged position in which said moveable element collaborates with a housing made in said plate and a disengaged position according to which said moveable element is in a recess forming said housing.

4. A child car seat, intended to be assembled on a passenger seat of a vehicle, wherein the child car seat comprises:
   a swivel seating part assembled on a fixed base so that the seat can be orientated according to at least two positions, a travelling position, forward facing, and at least one installing position, facing a side door of the vehicle; and
   return means for tending to return said swivel seating part to said travelling position, wherein said return means are:
      inactive, or disengaged, on a first angular section, starting from the installing position and ending at a pre-set intermediary position, the movement along the first angular section being manually ensured by the user; and
      active, or engaged, on a second final angular section, starting from said pre-set intermediary position and ending at said travelling position, so that the seat is systematically returned to the travelling position, without any manual intervention from the user, when it is in said second angular section
   wherein the swivel seating part comprises a swivel plate forming a cam in which lies at least one housing of which at least one of the edges creates a point of application for said return means.

5. The child car seat according to claim 4, wherein:
   said return means comprises two moveable elements, each assembled on said fixed base between an engaged position in which said moveable element collaborates with a housing made in said plate and a disengaged position according to which said moveable element is in a recess forming said housing; and
   said swivel plate has a single housing whose edges each create a point of application for each of said respective movable elements.

6. The child car seat according to any of claim 1, wherein said return means collaborate with at least one moveable element assembled so as to swivel on said base.

7. A child car seat, intended to be assembled on a passenger seat of a vehicle, wherein the child car seat comprises:
   a swivel seating part assembled on a fixed base so that the seat can be orientated according to at least two positions, a travelling position, forward facing, and at least one installing position, facing a side door of the vehicle; and
   return means for tending to return said swivel seating part to said travelling position, wherein said return means are:
      inactive, or disengaged, on a first angular section, starting from the installing position and ending at a pre-set intermediary position, the movement along the first angular section being manually ensured by the user; and active, or engaged, on a second final angular section, starting from said pre-set intermediary position and ending at said travelling position, so that the seat is systematically returned to the travelling position, without any manual intervention from the user, when it is in said second angular section wherein said return means collaborate with at least one moveable element assembled so as to swivel on said base, said swivel seating part comprises a swivel plate having at least one housing forming a cam; and said moveable element comprises at least one drive arm likely to penetrate said housing of said swivel plate and at least one return arm extending opposite said drive arm in relation to the axis of rotation of said moveable element.

8. The child car seat according to claim 7, wherein said return arm is coupled to elastic means tending to help the engaging of said drive arm into the housing of said plate.

9. The child car seat according to one of claim 6 and further comprising means for limiting the rotation of said moveable element.

10. The child car seat according to claim 1, and further comprising means for controlling the engaging and/or disengaging of said return means.

11. A child car seat, intended to be assembled on a passenger seat of a vehicle, wherein the child car seat comprises:

a swivel seating part assembled on a fixed base so that the seat can be orientated according to at least two positions, a travelling position, forward facing, and at least one installing position, facing a side door of the vehicle; and return element tending to return said swivel seating part to said travelling position, wherein said return element comprises:

an inactive, or disengaged, position on a first angular section of the swivel seating part, starting from the installing position and ending at a pre-set intermediary position, wherein movement of the swivel seating part along the first angular section relative to the return element is manually ensured by the user; and an active, or engaged, position on a second final angular section of the swivel seating part, starting from said pre-set intermediary position and ending at said travelling position, along which the return element applies a return force to the swivel seating part so that the seating part is systematically returned to the travelling position, without any manual intervention from the user, when it is in said second angular section.

12. The child car seat according to claim 11, wherein the child car seat comprises two installing positions, respectively adapted to left or right fitting in the vehicle, and wherein said return element is symmetric, so as to allow the swivel seating part to return to said travelling position in the same manner from one or other of the installing positions.

13. The child car seat according to claim 11, wherein said swivel seating part comprises a plate and said return element comprises at least one moveable element assembled on said fixed base between an engaged position in which said moveable element collaborates with a housing made in said plate and a disengaged position according to which said moveable element is in a recess forming said housing.

14. A child car seat, intended to be assembled on a passenger seat of a vehicle, wherein the child car seat comprises:

a swivel seating part assembled on a fixed base so that the seat can be orientated according to at least two positions, a travelling position, forward facing, and at least one installing position, facing a side door of the vehicle; and return element tending to return said swivel seating part to said travelling position, wherein said return element comprises:

an inactive, or disengaged, position on a first angular section of the swivel seating part, starting from the installing position and ending at a pre-set intermediary position, wherein movement of the swivel seating part along the first angular section relative to the return element is manually ensured by the user; and an active, or engaged, position on a second final angular section of the swivel seating part, starting from said pre-set intermediary position and ending at said travelling position, along which the return element applies a return force to the swivel seating part so that the seating part is systematically returned to the travelling position, without any manual intervention from the user, when it is in said second angular section wherein the swivel seating part comprises a swivel plate forming a cam in which lies at least one housing of which at least one of the edges creates a point of application for said return element.

15. The child car seat according to claim 14, wherein:

said return element comprises first and second moveable elements, each assembled on said fixed base between an engaged position in which said first moveable element collaborates with a housing made in said plate and a disengaged position according to which said first moveable element is in a recess forming said housing; and said swivel plate has a single housing whose edges each create a point of application for each of said respective first and second movable elements.

16. The child car seat according to any of claim 11, wherein said return element collaborates with at least one moveable element assembled so as to swivel on said base.

17. A child car seat, intended to be assembled on a passenger seat of a vehicle, wherein the child car seat comprises:

a swivel seating part assembled on a fixed base so that the seat can be orientated according to at least two positions, a travelling position, forward facing, and at least one installing position, facing a side door of the vehicle; and return element tending to return said swivel seating part to said travelling position, wherein said return element comprises:

an inactive, or disengaged, position on a first angular section of the swivel seating part, starting from the installing position and ending at a pre-set intermediary position, wherein movement of the swivel seating part along the first angular section relative to the return element is manually ensured by the user; and an active, or engaged, position on a second final angular section of the swivel seating part, starting from said pre-set intermediary position and ending at said travelling position, along which the return element applies a return force to the swivel seating part so that the seating part is systematically returned to the travelling position, without any manual intervention from the user, when it is in said second angular section wherein said return element collaborates with at least one moveable element assembled so as to swivel on said base said swivel seating part comprises a swivel plate having at least one housing forming a cam; and said moveable element comprises at least one drive arm likely to penetrate said housing of said swivel plate and at least one return arm extending opposite said drive arm in relation to the axis of rotation of said moveable element.

18. The child car seat according to claim 17, wherein said return arm is coupled to an elastic element, which helps the engaging of said drive arm into the housing of said plate.

19. The child car seat according to one of claim 16 and further comprising a limit stop, which limits rotation of said moveable element.

20. The child car seat according to claim 11 and further comprising means for controlling the engaging and/or disengaging of said return element.

* * * * *

UNITED STATES PATENT AND TRADEMARK OFFICE
CERTIFICATE OF CORRECTION

PATENT NO. : 7,614,692 B2
APPLICATION NO. : 10/918066
DATED : November 10, 2009
INVENTOR(S) : Richard M. Biaud It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Nineteenth Day of October, 2010

David J. Kappos
*Director of the United States Patent and Trademark Office*